United States Patent Office 3,510,254
Patented May 5, 1970

3,510,254
PREPARATION OF CARBONATED ZIRCONIUM HYDRATE IN READILY FILTERABLE FORM, FROM ZIRCONYL CHLORIDE
Russell N. Bell, Ardsley, N.Y., assignor to Stauffer Chemical Company, New York, N.Y., a corporation of Delaware
Filed Sept. 11, 1967, Ser. No. 666,800
Int. Cl. C22b 59/00
U.S. Cl. 23—22                3 Claims

ABSTRACT OF THE DISCLOSURE

A process for manufacturing the carbonated hydrate from a metal selected from the group consisting of zirconium and hafnium consisting of reacting the metal oxychloride with a sulfate donor under conditions that form the metal sulfate. This reaction product is further reacted with a carbonate doning material to form the corresponding hydrous carbonate which material retains the same shape as the original composition.

BACKGROUND OF THE INVENTION

Because of the amorphous nature or crystalline structure of zirconium derived compositions they have found wide use as pigments for paints, lacquers, resins and inks. These materials are also used in making dielectric components, as pharmaceutical agents, cross-linking agents, catalysts, piezoelectric crystals, as a color stabilizer for organic dyes, to increase light and efficiency of lacquers or resins used as light reflectors, crucibles, furnace linings, X-ray photography, substitute for calcium oxides and calcium lights, opacifier in white glass for indirect electric lighting, acid-proof enamel, refractory utensils, cermets, metallurgy, as a source of zirconium, and in abrasives and polishing agents. However, when these materials are used as a catalyst or cross-linking agents in some industries, such as adding waterproofing material to paper, they suffer either because of their limited solubility within suitable liquid medium, or because they contain ions which are detrimental to the products being treated.

Thus, there is a clear need for a zirconium derived product within the industry to be employed as a cross-linking agent when incorporating waterproofing materials within products that are soluble yet do not contain ions which are detrimental to the products on which they are employed and at the same time are economically attractive to produce and commercially practical for the production thereof.

BRIEF DESCRIPTION OF THE INVENTION

In the practice of the present invention, carbonated zirconium hydrate can be manufactured in a readily commercial manner by first reacting zirconyl chloride with a sulfate donor, such as sulfuric acid or other soluble sulfate to form a zirconium sulfate. Zirconium sulfate is then further reacted with a carbonate donor to form the carbonated zirconium hydrate. It has been found that the carbonated zirconium hydrate formed in this manner has the requisite solubility within certain mildly basic solutions or dilute acid solutions and does not furnish objectionable ions. The reactions between the various components should be carried out at a temperature of between 60 and 100° C., depending upon the reactive material.

BRIEF DESCRIPTION OF THE DRAWINGS

FIG. 1 is a photomicrograph of zirconium sulfate particles.

FIG. 2 is a photomicrograph of carbonated zirconium hydrate.

FIG. 3 is a photomicrograph of particles obtained by reacting zirconyl chloride with sodium carbonate.

DETAILED DESCRIPTION OF THE INVENTION

It has been discovered that a readily filterable carbonated zirconium hydrate can be manufactured using a water soluble zirconium salt such as zirconyl chloride by first converting to the sulfate then reacting it with an alkli metal carbonate or bicarbonate in such a way that the structure of the zirconium sulfate particle is retained. This is brought about by admixing together in aqueous solution, dewatered crystals of zirconyl chloride

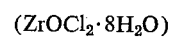

$(ZrOCl_2 \cdot 8H_2O)$ and an effective amount of a sulfate donor to convert the zirconyl chloride to zirconium sulfate

$(5ZrO_2 3SO_3 \cdot XH_2O)$.

The "$XH_2O$" moiety represents a variable degree of hydration. The sulfate donor employed in the present invention may either be dilute sulfuric acid or an alkali metal sulfate selected from the group consisting of sodium sulfate, potassium sulfate. This initial reaction should be at an elevated temperature of up to about 100° C. Thus, an effective amount of zirconyl chloride is dissolved in a sufficient amount of water and filtered. The solution is then heated slowly with agitation. At the requisite temperature will precipitate the zirconium sulfate will precipitate very rapidly. The slurry is maintained at the temperature for a period of time of up to about one hour and then the precipitate filtered on a coarse frit filter and washed with water.

The above reaction product is then resuspended in water and heated up to about 80° C. A carbonate donor is added while agitating the slurry. The carbonate donor may be selected from the group consisting essentially of sodium carbonate, sodium bicarbonate, potassium carbonate, potassium bicarbonate, ammonium carbonate, ammonium bicarbonate and mixtures thereof. The heating and the agitation may continue for up to about thirty minutes. The residue may then be filtered on a coarse frit filter and washed with water. The final product is carbonated zirconium hydrate having the approximate composition $(ZrO_2 \cdot CO_2 \cdot XH_2O)$, in a form which can be readily filtered and washed. Spectrographic analysis of this product indicates that the carbon dioxide is bound up within the crystalline molecule. The amorphous carbonated zirconium hydrate product thus prepared retains the original shape of the zirconium sulfate particle.

It should be noted that in the event that the solution of zirconyl chloride is reacted directly with a carbonate doning material, such as sodium carbonate, a gelatinous material is formed which is essentially unfilterable. On the other hand, zirconium carbonate of the present invention retains the original particle shape of the sulfate and is readily soluble in certain slightly basic or slightly acidic environments, thus giving rise to additional and further uses as cross-linking agent within those environments which require soluble cross-linking agents. This is clearly evident from the photomicrographs illustrated in FIGS. 1, 2, and 3. FIG. 1 illustrates the crystal-like structures of zirconium sulfate, while FIG. 2 illustrates the crystallike structure of carbonated zirconium hydrate. The crystal-like structure of FIGS. 1 and 2 are for all practical purposes identical. FIG. 3 illustrates the gelatinous material obtained by reacting the zirconyl chloride with sodium carbonate. The amorphous structure is clearly unsuitable.

Having thus described the invention in general terms, reference is now made to the following specific examples.

Example 1

Dried, crystalline zirconyl chloride ($ZrOCl_2 \cdot 8H_2O$) in an amount of 48.5 grams was dissolved in 200 ml. of water and filtered. To the solution was added 9.2 grams of a 98% solution of sulfuric acid and the solution heated to around 80 to 85° C. and agitated. At this temperature precipitation was quite rapid. The slurry was head at 80 to 85° C. for 60 minutes then filtered on a coarse frit filter and washed with water. The residue was air dried and determined to be zirconium sulfate in an amount of 39.8 grams or 96.5% of that theoretically obtainable.

Example 2

Dried, crystalline zirconyl chloride ($ZrOCl_2 \cdot 8H_2O$) in an amount of 30 grams was dissolved in 100 ml. of water and 8 grams of sodium sulfate added. The solution was heated slowly with agitation to around 70° C. at which temperature precipitation took place. The slurry was further heated and held at 80 to 90° C. for 30 minutes then filtered and washed on a coarse, frit filter. The residue was air dried and determined to be 22 grams of zirconyl sulfate or 80% of that theoretical obtainable.

Example 3

Zirconyl sulfate prepared in a manner as set forth in Example 1 and in an amount of 30 grams was suspended in 200 ml. of water and heated to 70 to 80° C. To this slurry was added 15 grams of sodium carbonate, which is 100% in excess of the calculated amount, and the slurry heated with agitation for 20 minutes. The residue was filtered off on a coarse frit filter and washed slightly with water. The product filtered and washed readily. By microscopic examination the final product, carbonated zirconium hydrate, appeared to have the same size and shape as the sulfate starting material. Tests indicate that the carbonated zirconium hydrate so formed had a much higher rate of solubility in certain weak basic materials and dilute acids than did the non-carbonated hydrate.

While the above invention has been described in detail using zirconium as the starting metal, it should be readily apparent and understood to those skilled in the art that hafnium may be employed in the same manner as set forth above.

What is claimed is:

1. A process for making a carbonated hydrate of zirconium or halfnium in readily filterable form which comprises dissolving the crystalline oxychloride of said metal in a solvent comprising water, reacting said oxychloride with an effective amount of a sulfate donor selected from the group consisting of sulfuric acid, sodium sulfate, potassium sulfate, and mixtures thereof to convert said oxychloride to the corresponding sulfate, recovering crystal-like particles of said sulfate, suspending said sulfate particles in water and reacting same at a temperature between about 60° C. and about 100° C. with a carbonate selected from the group consisting of sodium carbonate, sodium bicarbonate, potassium carbonate, potassium bicarbonate, ammonium carbonate, ammonium bicarbonate and mixtures thereof to convert the sulfate to the corresponding carbonated hydrate having essentially the same crystal-like structure as the sulfate, and recovering said carbonated hydrate.

2. The process of claim 1 wherein said carbonated hydrate comprises carbonated zirconium hydrate.

3. The process of claim 1 wherein said carbonated hydrate comprises carbonated hafnium hydrate.

References Cited

UNITED STATES PATENTS

| | | |
|---|---|---|
| 1,307,883 | 6/1919 | Rohenhain et al. |
| 1,316,107 | 9/1919 | Pugh. |
| 2,316,141 | 4/1943 | Wainer. |
| 2,387,046 | 10/1945 | Wainer _____ 23—24 |
| 2,507,128 | 5/1950 | Wainer _____ 23—61 X |
| 2,930,735 | 3/1960 | Vogel _____ 23—61 X |

HERBERT T. CARTER, Primary Examiner

U.S. Cl. X.R.

23—23, 61